Patented Aug. 28, 1923.

1,466,575

UNITED STATES PATENT OFFICE.

LOUIS BONNET, OF PERPIGNAN, FRANCE, ASSIGNOR TO JEAN PAISSEAU, OF PARIS, FRANCE.

MANUFACTURE OF ARTIFICIAL PEARLS.

No Drawing. Application filed April 24, 1922. Serial No. 556,328.

*To all whom it may concern:*

Be it known that I, LOUIS BONNET, a citizen of the Republic of France, and residing at Perpignan (Pyrenees-Orientales Department) No. 35 bis Rue des Augustins, in the Republic of France, have invented certain new and useful Improvements in the Manufacture of Artificial Pearls, of which the following is a specification.

My invention relates to a process of manufacture of pearls in glass or enamel in an easy, rapid and economical manner.

In the known processes, the pearls have been as a rule supported during their manufacture by means of a thin copper tube or wire which must then be destroyed by dissolving the same in an acid bath for the purpose of removing the pearls. This method involves considerable trouble and has the drawback of requiring the use of acid.

In the present invention, the support consists of a solid metal wire whose surface is covered with a thin coating of a substance which is refractory to heat as well as friable, whose effect is to prevent the fused glass or enamel from adhering to the metal so that the pearls can be removed from the wire without destroying the latter. The supporting wire will last indefinitely if required, and it is simply necessary to renew on each occasion the coating of refractory and friable substance, this being carried out with facility and at small expense.

The said coating may be made for example of a mixture of alumina and kaolin in equal parts, the mixture being worked up with a suitable quantity of water to form a paste which can be readily applied by means of a spatula or a brush upon the wire which is rotated at the same time.

In the same process the rotating member or axle containing the series of pearls under treatment, instead of being constituted by a wire which requires to be maintained in the stretched position in order to preserve the necessary rigidity, may be formed of a rigid spindle which may be held at only one end in a suitable revoluble support.

Claims:

1. In a process of manufacture of artificial pearls by means of a revoluble metal axle whereupon are disposed drops of glass or enamel, the application of a refractory and readily disaggregated coating upon the said revoluble axle before the said drops of glass or enamel are disposed thereon.

2. In a process of manufacture of artificial pearls by means of a revoluble metal axle whereupon are disposed drops of glass or enamel, the application of a refractory and readily disaggregated coating upon the said revoluble axle before the said drops of glass or enamel are disposed thereon, the said layer being composed of equal parts of alumina and kaolin mixed with a small quantity of water.

3. A process of manufacture of artificial pearls consisting in the use of a solid metal axle, in covering the said axle with a refractory and readily disaggregated coating, in rotating the said axle, in disposing thereupon drops of glass or enamel, and in subsequently removing the axle from the pearls by a sliding movement, by reason of the disaggregation of the said layer.

4. A process of manufacture of artificial pearls consisting in the use of a solid rigid spindle, in covering the said spindle with a refractory and readily disaggregated coating, in rotating the said spindle, in disposing thereupon drops of glass or enamel, and in subsequently removing the spindle from the pearls by a sliding movement, by reason of the disaggregation of said coating.

In testimony that I claim the foregoing as my invention I have signed my name in presence of a subscribing witness.

LOUIS BONNET.

Witness:
MAURICE ROUX.